(No Model.)
O. ANDERSON.
CURTAIN HOLDING DEVICE.
No. 522,176. Patented June 26, 1894.
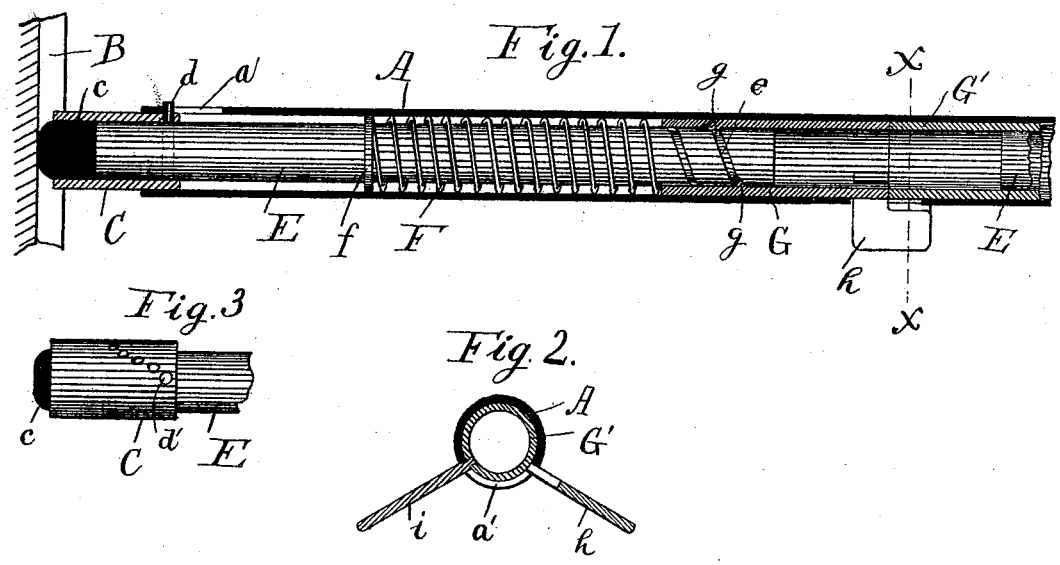
Witnesses:
E. Dudley Freeman
Jas Harris
Inventor:
Oliver Anderson
by S. W. Bates
his atty.
THE NATIONAL LITHOGRAPHING COMPANY,
WASHINGTON, D. C.

UNITED STATES PATENT OFFICE.

OLIVER ANDERSON, OF DEERING, ASSIGNOR TO EDWARD T. BURROWES, OF PORTLAND, MAINE.

CURTAIN-HOLDING DEVICE.

SPECIFICATION forming part of Letters Patent No. 522,176, dated June 26, 1894.

Application filed April 30, 1894. Serial No. 509,431. (No model.)

*To all whom it may concern:*

Be it known that I, OLIVER ANDERSON, a citizen of the United States, and a resident of Deering, in the county of Cumberland and State of Maine, have invented certain new and useful Improvements in Curtain-Holding Devices; and I hereby declare the following to be a full, clear, and exact description of the said invention, such as will enable others skilled in the art to which it appertains to make and use the same.

My invention relates to that class of curtain holding devices wherein the lower edge of the curtain is provided with a hollow curtain stick having spindles projecting from its ends, each spindle being provided with friction tip which is pressed against the window casing by means of a spring acting on the spindle.

The object of my invention is to construct the curtain stick so that it may be easily adjusted to windows of varying widths, and to provide mechanism for retracting the spindle which shall be easily put together, which shall have power enough to act against the stiff spring used for this purpose and which shall be able to resist the hard usage to which these curtains are often exposed. I accomplish this result chiefly by the application of the screw principle to the retraction of the spindle, providing the inner end of the spindle with a worm or screw which is operated by a sleeve nut rotated by a suitable handle. The rotation of the nut serves to draw in the screw and retract the spindle and the friction tip.

I illustrate my invention by means of the accompanying drawings which shows a curtaid stick as I prefer to construct it.

In the drawings Figure 1 is a central longitudinal section along the hollow curtain stick showing the spindle in elevation. Fig. 2 is a section on the line $x$ $x$ of Fig. 1 and Fig. 3 is an elevation of the end of the spindle.

A represents the tubular curtain stick something more than half being shown but both ends of the curtain stick are exactly alike.

B is a section of the grooved casing against which impinges the friction tip $c$ secured to the outer end of the spindle E by means of the sleeve C. The spindle is held within the tube A in such a manner as to prevent its turning within the tube but so as to allow a certain amount of longitudinal motion. As herein shown I accomplish this by forming a longitudinal slot $a$ in the tube near its end and through this slot projects a pin $d$ the said pin being also used to secure the sleeve C to the end of the spindle. On the inner end of the spindle is a screw or worm which I provide for as here shown by cutting a screw thread $e$ on the inner end of the spindle proper although it is evident that a separate screw or worm can be secured to the inner end of the spindle without being made an integral part of it.

A sleeve nut G fits within the tube A and receives the screw or worm in its outer end. It is provided with projections $g$ $g$ on its inner surface which perform the same function as male screw threads by engaging the screw thread $e$. The sleeve nut G is rotated within the tube A by means of the handle lever $h$ which projects out through an opening $a'$ in the under side of the tube A at or near the center thereof. The handle lever $h$ is secured to the sleeve nut by fitting in a dovetail groove at the inner end of the sleeve nut so that the handle lever can be slipped into place from the end of the sleeve nut. The inner end of the opposite sleeve nut G' abuts against the end of the sleeve nut G and so serve to hold the handle lever $h$ in place.

$i$ represents the handle lever which is secured to the sleeve nut G' and which is opposed to the handle lever $h$. When in position the two handle levers set at a considerable angle from each other as shown in Fig. 2, their motion away from each other being limited by the sides of the opening in the tube through which they pass. The spindle is pressed outward by means of the usual coiled spring F which impinges at one end against a flange $f$ and at the other against the outer end of the sleeve nut G.

A series of holes $d'$ is formed in the sleeve C by which the pin $d$ can be adjusted to hold the spindle with more or less projection from the end of the tube and by which the length of the tube can be adjusted to fit different windows. The holes $d'$ are formed in a line on the surface of the sleeve C which is parallel with the screw thread on the inner end of the spindle.

From what has been said the operation of my device is evident. When the handle levers h and i are grasped by the thumb and fingers and pressed toward each other the sleeves G and G' are rotated in opposite directions, drawing in the spindle through the action of the screws on their inner ends. By removing the pin d the spindle may be screwed out or in until the curtain stick is the proper length, the pin being then inserted in one of the holes d'.

It will be thus seen that the curtain stick may be readily changed in length without changing the position of the handle levers and that any desired amount of power may be applied to the spindle by changing the pitch of the screw.

I claim—

1. A curtain holding device consisting of a hollow tube, a spring actuated spindle having a friction tip on its outer end and a worm or screw on its inner end the said spindle being held within the tube in such a manner as to allow it a longitudinal but not a rotatable motion, a sleeve nut in engagement with the said worm or screw and a handle for rotating said sleeve nut whereby the said friction tip is retracted, substantially as described.

2. A curtain holding device consisting of a hollow tube, a spring actuated spindle fitted therein, said spindle being provided on its outer end with a friction tip and at its inner end with a worm or screw, a sleeve nut in engagement with said worm or screw, a handle lever for rotating said sleeve nut, the outer end of said tube being provided with a longitudinal slot, a series of holes in the outer end of said spindle and a pin adapted to fit said holes and to pass through said slot, substantially as described.

OLIVER ANDERSON.

Witnesses:
S. W. BATES,
E. DUDLEY FENNER.